(No Model.)

T. J. MAYALL.
BOX FOR LAYING LINES OF TELEGRAPH WIRE.

No. 291,371. Patented Jan. 1, 1884.

UNITED STATES PATENT OFFICE.

THOMAS J. MAYALL, OF READING, MASSACHUSETTS.

BOX FOR LAYING LINES OF TELEGRAPH-WIRE.

SPECIFICATION forming part of Letters Patent No. 291,371, dated January 1, 1884.

Application filed March 24, 1881. (No model.)

*To all whom it may concern:*

Be it known that I, THOMAS J. MAYALL, of Reading, in the county of Middlesex and Commonwealth of Massachusetts, have invented a new and useful Improvement in Boxes for Laying Lines of Telegraph-Wires Underground or otherwise, of which the following is a specification.

My invention relates to the material of which such boxes are to be made, the form and construction of the boxes, and the manner of laying them, the object of it being to provide a convenient and efficient method and means of protecting and insulating a line of telegraph-wires laid under or above the surface of the ground. For the construction of such boxes I use as the best non-conducting material that I know of a compound of rubber and graphite, thoroughly ground, and mixed with a portion of sulphur, to aid in vulcanizing; and, vulcanized, I mold the boxes in two parts, the lower part being usually the receiving part, and the upper part the cover, made to fit tightly together, and then vulcanize them in or out of the mold, as in practice may be found most desirable. The rubber and graphite are used in the proportion of one pound of rubber to about two and one-half to four pounds of graphite, and about eight ounces of sulphur. These boxes are formed and vulcanized in molds of convenient length—say from four to twelve feet, generally—and need no finish after vulcanizing, except to square or otherwise adapt the ends to be joined together. In laying them in a line of telegraph, the lower or receiving part is first put down, with a piece of plastic sheet of the rubber and graphite compound under each joint, this being continued for some distance. The wire or wires, insulated or otherwise, are laid in the box. The covers are then put on with rubber cement in the joint between them and the lower or receiving part of the box. The plastic rubber at the end joint is then well covered with cement on the inner side, and closely wrapped around the joint. The work being well done, the box is perfectly tight, and no moisture or air can enter it, except at the open ends. The open ends may also be tightly closed with plastic rubber and graphite compound and cement. If it is desirable to branch off a part of the wires of a line at any given point, the box may be made with a branch at that point, into which any portion of the wires in the main line may be diverged to reach a station, or to construct a branch line.

If more than one wire is to be laid in the box here described, each wire must be insulated by itself from all the other wires laid in the box.

Figure 1:
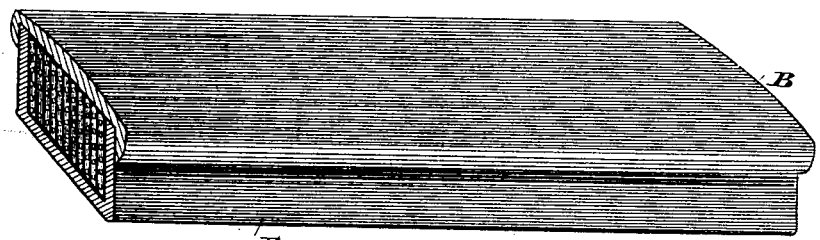
Figure 2:
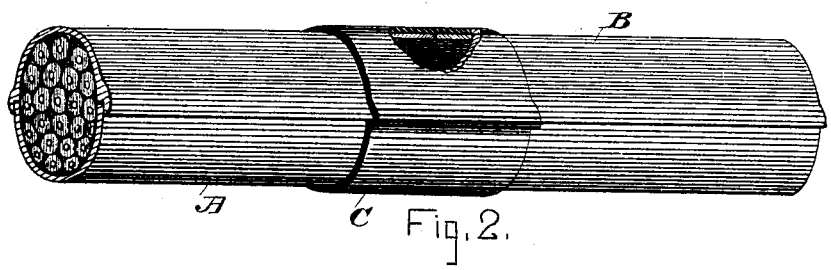
Figure 3:
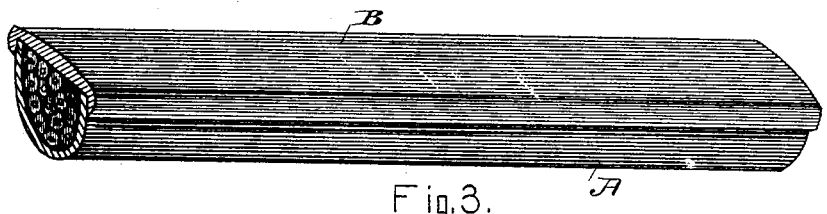
Figure 4:
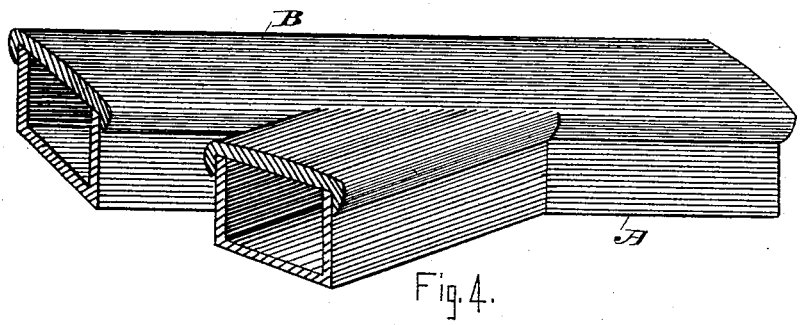

In the drawings annexed, Figures 1, 2, and 3 show the different forms in which the box may be conveniently made. Fig. 4 shows a piece of the box with a branch.

In all the figures, A is the lower or receiving part of the box, and B the upper part or cover. In Fig. 2 the sheet C, of rubber and graphite composition, is shown surrounding a joint in the box A B. The composition of vulcanized rubber and graphite not only is a good insulator, but it resists for a long time; in fact, is almost unaffected by the action of moisture and other influences to which the boxes for containing underground conductors are exposed. This material also is very tough and practically impermeable, and being in its manufacture plastic, it can be readily made in any desired shape.

No claim is made herein broadly to the composition of rubber and graphite vulcanized as an electrical insulating medium, this being claimed in my application of even date herewith, officially numbered 29,124, for insulating electrical conductors, in which a conductor coated with such composition is also specifically claimed, the composition in this latter case being preferably vulcanized to a less degree than in the manufacture of boxes herein described, in order that it may be more flexible than is necessary or desirable in these boxes.

What I do claim, and desire to secure by Letters Patent, is—

1. A box for containing electrical conductors, formed of a composition of vulcanized rubber and graphite in the proportions substantially as described, the graphite being in excess of the rubber, as set forth.

2. A box of rubber and graphite composition, for containing electrical conductors, the same comprising a trough and cover, and having the joints cemented with rubber cement, substantially as described.

3. A box for containing electrical conductors, having the joints between the sections cemented and enveloped in a sheet of rubber composition, substantially as described.

THOS. J. MAYALL.

Witnesses:
CHS. HOUGHTON,
F. L. HOUGHTON.